May 10, 1949.  J. WOLFF  2,469,621
APPARATUS FOR STRIPPING AND DRYING
ARTIFICIAL SAUSAGE SKINS
Filed Dec. 2, 1941
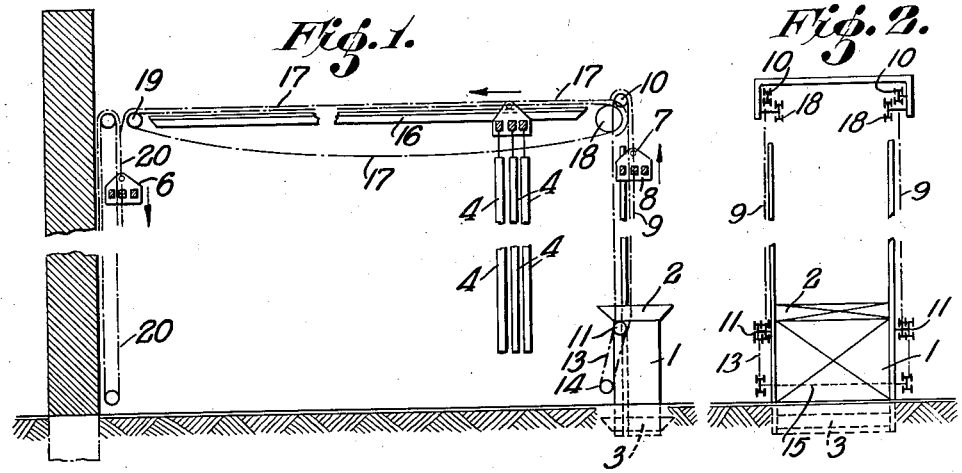
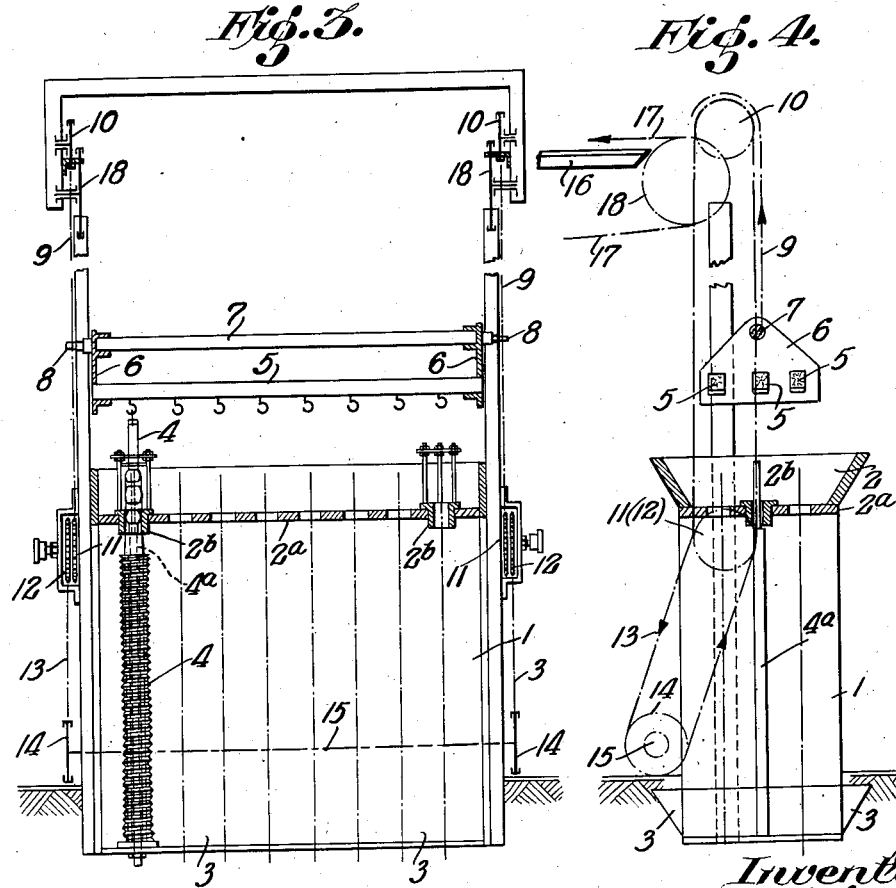
Inventor:
JULIUS WOLFF,
by Louise O'Neil
Attorney Patented May 10, 1949

2,469,621

UNITED STATES PATENT OFFICE 2,469,621

APPARATUS FOR STRIPPING AND DRYING ARTIFICIAL SAUSAGE SKINS

Julius Wolff, Amstenrade, Netherlands; vested in the Attorney General of the United States Application December 2, 1941, Serial No. 421,394
In Germany May 3, 1937

5 Claims. (Cl. 91—55)

1

The present invention relates to an apparatus for stripping and drying artificial sausage skins.

In the known plants for drying artificial sausage skins made from impregnated fabric tubes, in which a plurality of tubes is withdrawn upwardly from vertical mandrels for the purpose of suspending, each of the tubes is carried upwardly through an annular gap by a common supporting device. The supporting devices at the upper end of the vertical stroke were simply suspended from horizontal suspension bars upon which they remained untouched until the drying process was terminated. The impregnating device, located on the floor of the work room, was moved upon rails extending in parallel to the upper horizontal suspension bars so that the group of tubes drawn upwardly each time together with its supporting device was simply suspended behind the already suspended groups, whereupon the impregnating device was further moved upon the rails to produce the next group. In order to allow the supporting device, consisting of a simple horizontal beam, to be brought over the suspension bars, the impregnating device together with the supporting device was adapted to be rotated about a vertical axis through such an angle that the supporting beam passed between the suspension bars, in order to be then rotated into the transverse position and to be suspended.

This method was rather complicated and required impregnating devices moving on rails, and further required a continuous change of the position of the attendants who progressively had to travel from one end of the work room to the other.

Compared with the above-described method a substantial improvement is obtained if in accordance with the present invention the impregnating device is stationary and the individual groups of tubes are stripped from a corresponding group of mandrels while being suspended at their upper ends during impregnation. After each group has been suspended at the proper height, it is transferred to a horizontally moving endless chain conveyor and thereafter moved horizontally. In this manner, the entire production over a given working period is suspended from the chain conveyor where drying is permitted. After drying, the groups are automatically removed at the opposite end of the conveyor from the end where the groups were introduced and by means of vertically movable endless conveyor chains.

A device for carrying out the method according to the present invention is shown in the accompanying drawing by way of example.

In this drawing:

Fig. 1 is a vertical longitudinal sectional view showing the general arrangement of a plant according to the invention, Fig. 2 is an end view of the plant illustrated in Fig. 1, Fig. 3 is an enlarged detail sectional view of the structure shown in Fig. 2, and Fig. 4 is an enlarged detail sectional view of the right-hand portion of Fig. 1.

Upon the floor of the work room an impregnating device 1 is arranged. The latter, for instance, consists of a frame having an upper supply trough 2 for the liquid impregnating mass, and a lower trough 3 for receiving the mass flowing off of the impregnated tubes 4. In the bottom 2a of the trough 2, holes for inserting annular nozzles 2b are provided. The tubes 4 are withdrawn in groups from vertical tubes, posts or mandrels 4a arranged below the trough 2 while being pulled upwardly through the nozzles, whereby the tubes are impregnated by the mass present in the trough 2.

The individual tubes 4 are impregnated by groups. In the construction shown three parallel groups are suspended by means of hooks on transverse beams 5, which beams are supported side by side by means of plates 6. These plates in turn, are suspended from a transverse beam 7, the opposite ends of which are provided with outwardly projecting pins 8. These pins may be removably supported by a pair of laterally arranged vertically movable conveyor chains 9. The chains 9 are each mounted upon upper and lower sprocket wheels 10 and 11, which wheels may be rotated either by hand or by a motor. Sprocket wheels 12, chains 13, sprocket wheels 14 and the transverse shaft 15 transmit the uniform movement from one chain 9 to the other. Thus it is seen that members 5 to 11, inclusive, serve the dual function of simultaneously stripping and suspending the skins 4 from the respective mandrels 4a.

As soon as a complete group of tubes, corresponding to the number of the individual nozzles, is wound upwardly in the manner described from the positions shown in Figs. 3 and 4 to substantially the position shown in Fig. 1, these tubes are deposited upon a horizontal supporting guide 16 arranged below the ceiling of the room. For example at the upper point of reversal of chain 9, the projecting pins 8 of the beam 7 drop off the vertical chains 9 upon the horizontal endless conveyor chains 17, the latter chains being mounted upon sprocket wheels 18 and 19. As soon as a finished group of impregnated tubes has been wound upwardly, a sufficient distance to be stripped from the corresponding tubes or mandrels 4a and to clear the upper portion of the impregnating device the above-mentioned transfer to supports 16 is effected to thereby provide space for the next upwardly moving group of tubes being impregnated. This method is continued in this manner, until the entire daily production is suspended from the upper track. In this condition the tubes are dried over night. On the next day the process is continued by impregnating new tubes. At the other end of the conveyor track 16 the tubes which have been dried over night are successively lowered in groups from the upper track by means of vertical endless chains 20. The dry tubes are removed to be further treated.

The details of the device for carrying out the new method may be more or less changed without altering the method itself and without departing from the present invention.

What I claim is:

1. In combination with an impregnating device for tubular sausage skins and the like, a plurality of elongated vertically disposed mandrels in said device, each mandrel adapted to have a skin sleeved thereover, suspension means engageable with the upper ends of said sleeved skins for simultaneously stripping the latter axially from said mandrels in suspended positions, and means cooperating with said first means for moving said suspended skins laterally of their stripping axes.

2. In combination with an impregnating device for tubular sausage skins and the like, a plurality of upwardly extending posts disposed in said device, each post adapted to have a skin sleeved thereover, means engageable with the upper ends of said sleeved skins for axially stripping the latter from the posts in suspended positions, and means for moving said suspended skins laterally of their stripping axes and laterally from said stripping means.

3. In combination with an impregnating device for tubular sausage skins and the like, a plurality of substantially elongated parallel mandrels over which said skins are adapted to be sleeved, supporting means connectible to said sleeved skins, and means including an endless chain conveyor for moving said supporting means and connected skins axially of said mandrels to thereby strip the skins from the latter.

4. In combination with an impregnating device for tubular sausage skins and the like, a plurality of substantially elongated parallel mandrels over which said skins are adapted to be sleeved, supporting means connectible to said sleeved skins, means including an endless chain conveyor for moving said supporting means and connected skins axially of said mandrels to thereby strip the skins from the latter, and means including a second endless chain conveyor for moving said supporting means and connected skins laterally of their stripping axes and laterally from said first conveyor.

5. In combination with an impregnating device for tubular sausage skins and the like, a plurality of substantially vertical elongated mandrels over which said skins are adapted to be sleeved, supporting means connectible to said sleeved skins, an endless chain conveyor for detachably supporting said supporting means and for moving said supporting means and connected skins axially of said mandrels to thereby strip the skins from the latter, a horizontally disposed second endless chain conveyor having one end thereof operatively associated with the upper end of said first conveyor and adapted to receive the detachable supports from the first conveyor, and a vertically disposed third endless chain conveyor having the upper end thereof operatively associated with the other end of said second conveyor for receiving and lowering said supports from the second conveyor.

JULIUS WOLFF.

REFERENCES CITED

The following references are of record in the file of this patent:

UNITED STATES PATENTS

| Number | Name | Date |
|---|---|---|
| 5,773 | Stearms | Sept. 19, 1848 |
| 350,869 | Crane | Oct. 12, 1886 |
| 801,523 | Hinchman et al. | Oct. 10, 1905 |
| 1,086,731 | Rudolph | Feb. 10, 1914 |
| 1,790,501 | Fox | Jan. 27, 1931 |
| 2,066,628 | Larson et al. | Jan. 5, 1937 |
| 2,105,273 | Smith | Jan. 11, 1938 |
| 2,125,025 | Huckfeldt et al. | July 26, 1938 |
| 2,269,592 | McGraw | Jan. 13, 1942 |
| 2,350,857 | Wolff | June 6, 1944 |